(12) United States Patent
Bedrosyan et al.

(10) Patent No.: US 9,856,739 B2
(45) Date of Patent: Jan. 2, 2018

(54) TURBINE BLADES WITH TIP PORTIONS HAVING CONVERGING COOLING HOLES

(71) Applicant: HONEYWELL INTERNATIONAL INC., Morristown, NJ (US)

(72) Inventors: Loris Bedrosyan, Scottsdale, AZ (US); Ardeshir Riahi, Scottsdale, AZ (US); Daniel C. Crites, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1046 days.

(21) Appl. No.: 14/030,647

(22) Filed: Sep. 18, 2013

(65) Prior Publication Data
US 2015/0078916 A1    Mar. 19, 2015

(51) Int. Cl.
*F01D 5/20* (2006.01)
*F01D 5/18* (2006.01)
*F01D 11/10* (2006.01)

(52) U.S. Cl.
CPC .............. *F01D 5/20* (2013.01); *F01D 5/186* (2013.01); *F01D 5/187* (2013.01); *F01D 11/10* (2013.01); F05D 2240/307 (2013.01); F05D 2260/20 (2013.01); Y02T 50/673 (2013.01); Y02T 50/676 (2013.01)

(58) Field of Classification Search
CPC . F01D 5/20; F01D 5/187; F01D 5/186; F01D 11/10; F05D 2240/307; F05D 2260/20; F05D 2260/202; F05D 2260/205; Y02T 50/676; Y02T 50/673
See application file for complete search history.

(56) References Cited

U.S. PATENT DOCUMENTS

| 4,142,824 A | 3/1979 | Andersen |
| 4,390,320 A | 6/1983 | Eiswerth |
| 4,529,357 A | 7/1985 | Holland |

(Continued)

FOREIGN PATENT DOCUMENTS

| EP | 1281837 A1 | 2/2003 |
| EP | 1422383 A2 | 5/2004 |

(Continued)

OTHER PUBLICATIONS

EP Search Report, EP 11174595.6-2321 dated May 10, 2011.

(Continued)

*Primary Examiner* — Dwayne J White
*Assistant Examiner* — Adam W Brown
(74) *Attorney, Agent, or Firm* — Lorenz & Kopf, LLP

(57) ABSTRACT

A turbine rotor blade is provided with for a turbine section of an engine that includes a shroud surrounding the rotor blade. The rotor blade includes a platform and an airfoil extending from the platform into a mainstream gas path. The airfoil includes a pressure side wall, a suction side wall joined to the pressure side wall at a leading edge and a trailing edge, a tip cap extending between the suction side wall and the pressure side wall, a first squealer tip extension extending from the pressure side wall at a first angle relative to the pressure side wall, the first squealer tip extension defining a first cooling hole that converges between an inlet and an outlet; an internal cooling circuit configured to deliver cooling air to a gap between the pressure side squealer tip extension and the shroud via the first cooling hole.

17 Claims, 6 Drawing Sheets

(56) References Cited

U.S. PATENT DOCUMENTS

| | | | |
|---|---|---|---|
| 4,589,823 A | 5/1986 | Koffel | |
| 5,039,562 A | 8/1991 | Liang | |
| 5,192,192 A | 3/1993 | Ourhaan | |
| 5,282,721 A | 2/1994 | Kildea | |
| 5,688,107 A | 11/1997 | Downs et al. | |
| 5,733,102 A | 3/1998 | Lee et al. | |
| 6,164,914 A * | 12/2000 | Correia | F01D 5/186 415/115 |
| 6,179,556 B1 | 1/2001 | Bunker | |
| 6,190,129 B1 | 2/2001 | Mayer et al. | |
| 6,231,307 B1 | 5/2001 | Correia | |
| 6,422,821 B1 | 7/2002 | Lee et al. | |
| 6,478,535 B1 | 11/2002 | Chung et al. | |
| 6,494,678 B1 | 12/2002 | Bunker | |
| 6,527,514 B2 * | 3/2003 | Roeloffs | F01D 5/186 416/97 R |
| 6,602,052 B2 | 8/2003 | Liang | |
| 6,634,860 B2 | 10/2003 | Lee et al. | |
| 6,672,829 B1 * | 1/2004 | Cherry | F01D 5/141 415/115 |
| 6,790,005 B2 * | 9/2004 | Lee | F01D 5/187 416/97 R |
| 6,932,571 B2 * | 8/2005 | Cunha | F01D 5/18 416/97 R |
| 6,981,846 B2 | 1/2006 | Liang | |
| 6,994,514 B2 * | 2/2006 | Soechting | F01D 5/187 415/115 |
| 7,192,250 B2 | 3/2007 | Boury et al. | |
| 7,351,035 B2 | 4/2008 | Deschamps et al. | |
| 7,473,073 B1 | 1/2009 | Liang | |
| 7,494,319 B1 | 2/2009 | Liang | |
| 7,510,376 B2 | 3/2009 | Lee et al. | |
| 7,530,788 B2 | 5/2009 | Boury et al. | |
| 7,591,070 B2 | 9/2009 | Lee | |
| 7,695,248 B2 | 4/2010 | Mons et al. | |
| 7,857,587 B2 * | 12/2010 | Correia | 416/228 |
| 7,922,451 B1 | 4/2011 | Liang | |
| 7,972,115 B2 * | 7/2011 | Potier | F01D 5/20 416/228 |
| 7,980,818 B2 | 7/2011 | Kizuka et al. | |
| 8,061,987 B1 | 11/2011 | Liang | |
| 8,061,989 B1 | 11/2011 | Liang | |
| 8,075,268 B1 | 12/2011 | Liang | |
| 8,092,178 B2 * | 1/2012 | Marini | F01D 5/20 416/96 R |
| 8,113,779 B1 | 2/2012 | Liang | |
| 8,182,221 B1 | 5/2012 | Liang | |
| 8,246,307 B2 | 8/2012 | Cheong et al. | |
| 8,366,394 B1 | 2/2013 | Liang | |
| 8,414,265 B2 | 4/2013 | Willett, Jr. | |
| 8,435,004 B1 | 5/2013 | Liang | |
| 8,491,263 B1 | 7/2013 | Liang | |
| 8,777,572 B2 | 7/2014 | Cheong et al. | |
| 2002/0197159 A1 | 12/2002 | Roeloffs | |
| 2003/0021684 A1 | 1/2003 | Downs et al. | |
| 2005/0232771 A1 | 10/2005 | Harvey et al. | |
| 2006/0120869 A1 | 6/2006 | Wilson et al. | |
| 2007/0134096 A1 | 6/2007 | Mons et al. | |
| 2007/0237637 A1 | 10/2007 | Lee et al. | |
| 2008/0118363 A1 | 5/2008 | Lee et al. | |
| 2009/0148305 A1 | 6/2009 | Riahi et al. | |
| 2010/0135813 A1 | 6/2010 | Marini et al. | |
| 2010/0135822 A1 | 6/2010 | Marini et al. | |
| 2010/0221122 A1 | 9/2010 | Klasing et al. | |
| 2011/0176929 A1 | 7/2011 | Ammann | |
| 2012/0070307 A1 * | 3/2012 | Poon | F01D 5/20 416/97 R |
| 2012/0201695 A1 | 8/2012 | Little | |

FOREIGN PATENT DOCUMENTS

| | | |
|---|---|---|
| EP | 1726783 A1 | 11/2006 |
| EP | 1736636 A1 | 12/2006 |
| EP | 2434097 A1 | 3/2012 |

OTHER PUBLICATIONS

EP Extended Search Report for Application No. 14182739.4 dated Apr. 7, 2015.
EP Extended Search Report for Application No. 14179939.5 dated Feb. 16, 2015.
Kwak, JS, et al.; Heat Transfer Coefficients and Film Cooling Effectiveness on the Squealer Tip of a Gas Turbine Blade; Turbine Heat Transfer Laboratory, Department of Mechanical Engineering, Texas A&M University, vol. 125, Oct. 2003, Transactions of the ASME, [Retrieved from Internet Jul. 10, 2013] [http://turbomachinery.asmedigitalcollection.asme.org].
Ahn, J, et al.; Film-Cooling Effectiveness on a Gas Turbine Blade Tip Using Pressure-Sensitive Paint; Turbine Heat Transfer Laboratory, Department of Mechanical Engineering, Texas A&M University, Journal of Heat Transfer, vol. 127, May 2005, [Retrieved from Internet Jul. 10, 2013] [http://heattransfer.asmedigitalcollection.asme.org].
USPTO Office Action for U.S. Appl. No. 14/055,568 dated Mar. 9, 2017.
USPTO Office Action for U.S. Appl. No. 14/055,521 dated Feb. 9, 2017.
USPTO Office Action for U.S. Appl. No. 14/055,521 dated Jun. 1, 2017.
USPTO Notice of Allowance for U.S. Appl. No. 14/055,568 dated Jul. 12, 2017.
USPTO Notice of Allowance for U.S. Appl. No. 14/055,521 dated Sep. 21, 2017.

* cited by examiner

TURBINE BLADES WITH TIP PORTIONS HAVING CONVERGING COOLING HOLES

TECHNICAL FIELD

The inventive subject matter generally relates to turbine assemblies, and more particularly relates to turbine blades for turbine assemblies.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. Operating temperatures may be, for example, 1100° C. As such, it is desirable to cool the rotor blades and stator vanes to prevent or reduce adverse impact and extend useful life. Mechanisms for cooling turbine rotor blades include ducting cooling air through internal passages and then venting the cooling air through holes formed in the airfoil. Internal and film cooling techniques attempt to maintain temperatures that are suitable for material and stress level. However, given the high temperature of engine operation, cooling remains a challenge, particularly in areas such as the turbine blade tips.

Accordingly, it is desirable to have a blade with an improved manner for cooling the blade tip while maintaining or improving engine efficiency. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In accordance with an exemplary embodiment, a turbine rotor blade is provided with for a turbine section of an engine that includes a shroud surrounding the turbine rotor blade. The rotor blade includes a platform and an airfoil extending from the platform into a mainstream gas path of the turbine section. The airfoil includes a pressure side wall, a suction side wall joined to the pressure side wall at a leading edge and a trailing edge, a tip cap extending between the suction side wall and the pressure side wall, a first squealer tip extension extending from the pressure side wall at a first angle relative to the pressure side wall, the first squealer tip extension defining a first cooling hole that converges between an inlet and an outlet; an internal cooling circuit configured to deliver cooling air to a gap between the pressure side squealer tip extension and the shroud via the first cooling hole.

In accordance with another exemplary embodiment, a turbine section of a gas turbine engine includes a shroud and a rotor assembly with a turbine rotor blade. The rotor blade includes a platform defining a mainstream gas path and an airfoil extending from the platform into the mainstream gas path. The airfoil includes a pressure side wall, a suction side wall joined to the pressure side wall at a leading edge and a trailing edge, a tip cap extending between the suction side wall and the pressure side wall, a first squealer tip extension extending from the pressure side wall to define a gap between the rotor assembly and the shroud, the first squealer tip extension extending at a first angle relative to the pressure side wall and defining a first cooling hole that converges between an inlet and an outlet, and an internal cooling circuit configured to deliver cooling air to the gap between the pressure side squealer tip extension and the shroud via the first cooling hole.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Exemplary embodiments discussed herein are directed to turbine blades capable of withstanding temperature environments that are higher than those for which conventional turbine blades are designed. Generally, the turbine blades include a tip portion with a first squealer tip extension extending from the pressure side wall, a second squealer tip extension extending from the suction side wall, and a recessed tip cap extending between the squealer tip extensions. The first and second squealer tip extensions are curved and/or angled in the upstream direction. A cooling hole extends through the first squealer tip extension to deliver cooling air to the gap between the rotor blade and surrounding shroud. In one exemplary embodiment, the cooling hole has a converging cross-sectional area such that the air has sufficient pressure to block a portion of the air from flowing into the gap as well as cooling such air. In some embodiments, the turbine blade further includes a step formed between the first squealer tip extension and the tip cap such that the cooling hole extends through the tip cap, the step, and the first squealer tip extension. As a result, the cooling holes are not blocked with the tip portion rubs against the shroud.

Figure 1:
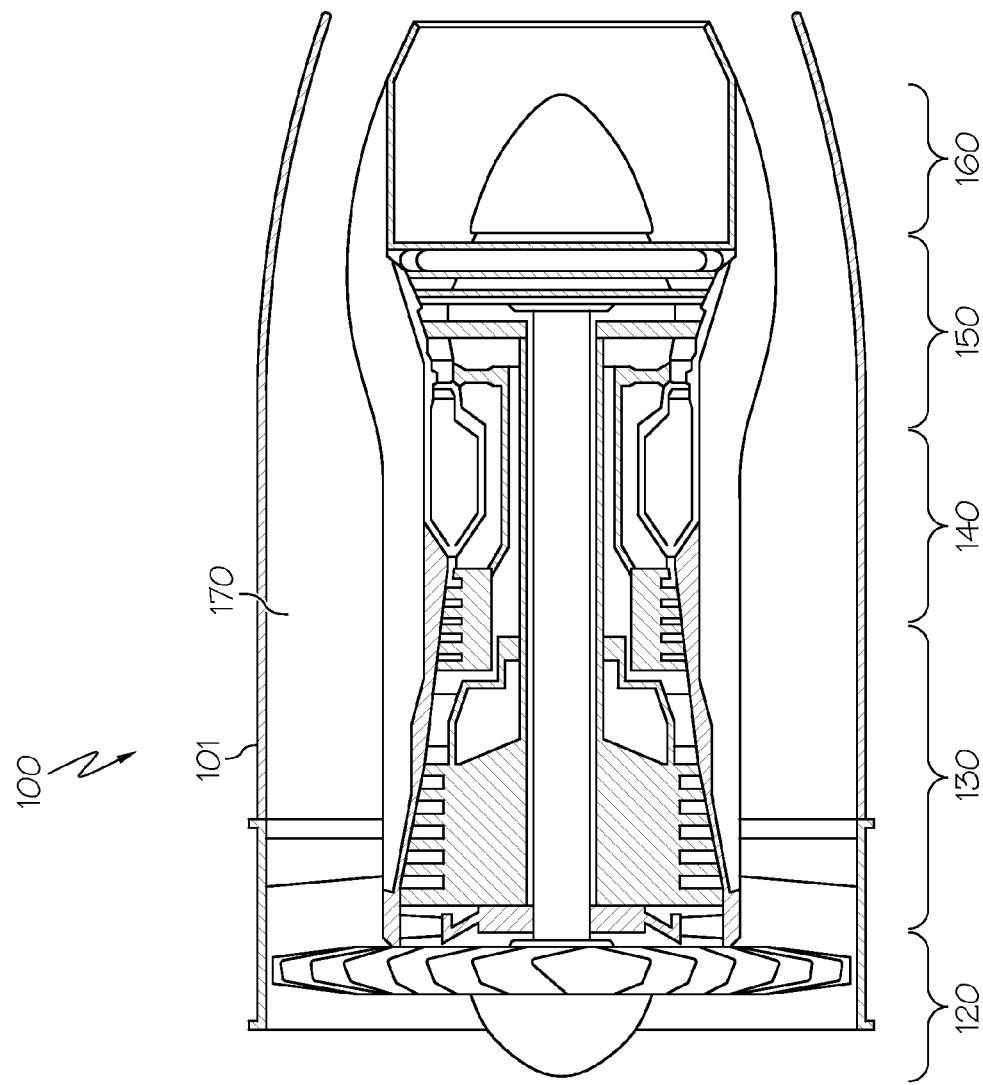
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
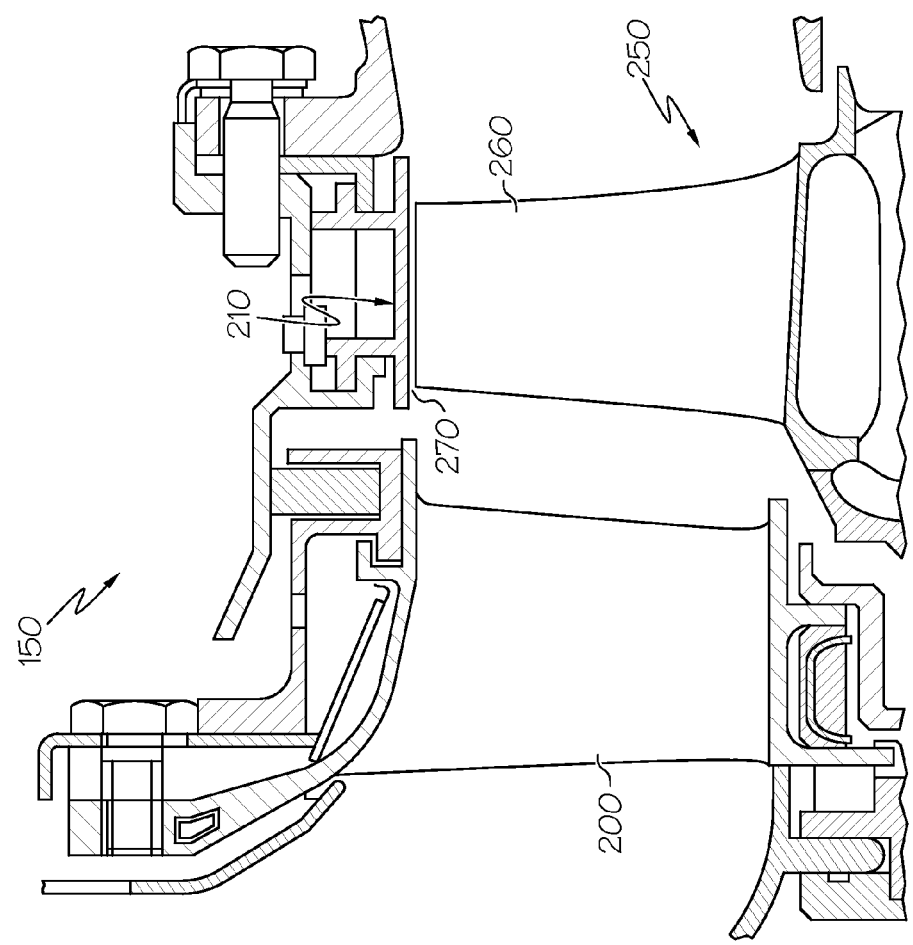
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream compressor section (e.g. compressor section 130 of FIG. 1) is directed. The cylindrical shroud 210 is disposed concentric to the rotor 250 to optimize aerodynamic efficiency and forms a radial gap (i.e., blade running clearance) 270 with an outermost diameter of the rotor 250. The radial gap 270 is typically very small, for example, in a range of about 0.25 millimeter (mm) to about 0.50 mm. In other embodiments, the radial gap 270 may be larger or smaller than these ranges. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled. For example, the rotor blades 260 may be cooled as described in greater detail below.

Figure 3:
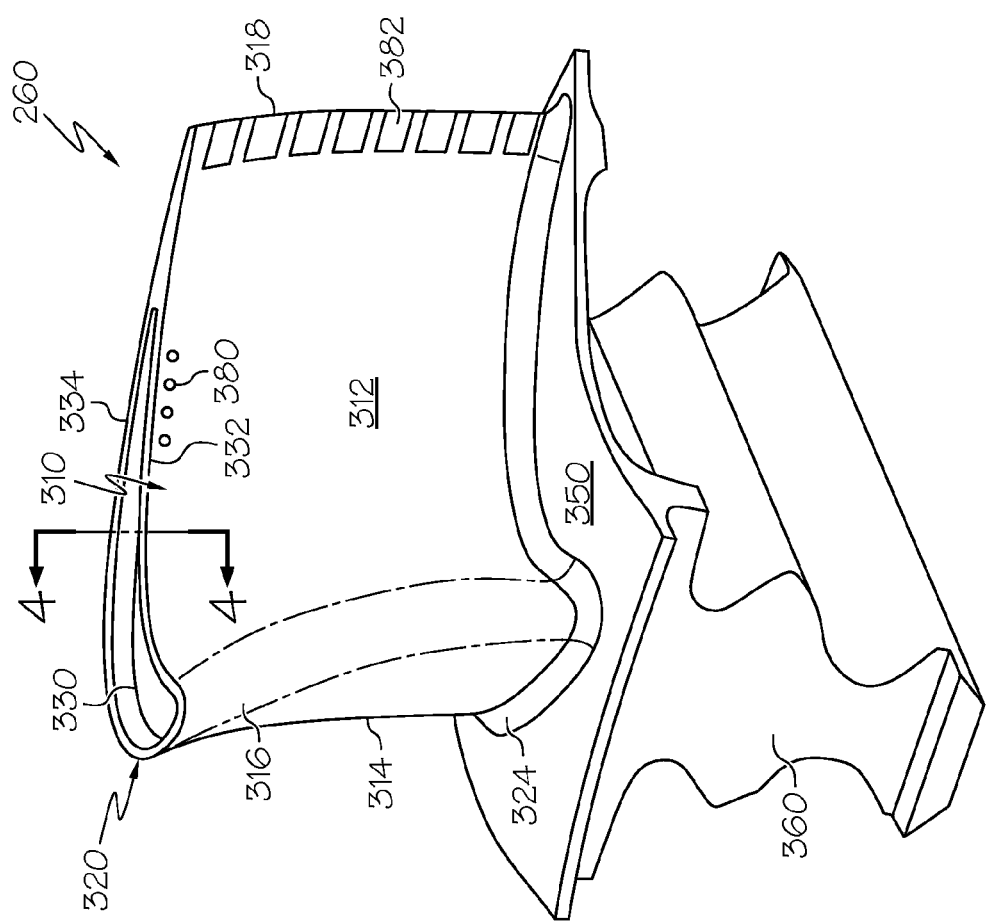
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform 350 and is configured to couple the blade 260 to a turbine rotor disc (not shown). In this manner, a circumferential ring of blades 260 may be formed about the rotor disc for rotation. In general, the rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The airfoil 310 has two side (or outer) walls 312, 314 each having outer surfaces that together define an airfoil shape. The first side wall 312 defines a pressure side with a generally concave shape, and the second side wall 314 defines a suction side with a generally convex shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics. The trailing edge 318 includes trailing edge slots 382, discussed below.

In an axial direction, the airfoil side walls 312, 314 extend from a base 324 at the platform 350 to a tip portion (or blade tip) 320. In general, the tip portion 320 is positioned to rotate in close proximity to the shroud 210 (FIG. 2) in order to maximize energy extraction. The tip portion 320 is formed by a tip cap (or tip wall) 330 and squealer tip extensions (or parapet walls) 332, 334. The tip cap 330 extends between the side walls 312, 314, typically from leading edge 316 to trailing edge 318. In some exemplary embodiments, the tip cap 330 is recessed relative to the squealer tip extensions 332, 334, which are formed by side walls 312, 314 extending radially beyond the tip cap 330. The tip cap 330 and squealer tip extensions 332, 334 may be designed to minimize the leakage of hot gasses over the tip portion 320 of the rotor blade 260.

As noted above, the rotor blade 260, particularly the airfoil 310, is subject to extremely high temperatures resulting from high velocity hot gases ducted from the combustion section 140 (FIG. 2). If unaddressed, the extreme heat may affect the useful life of an airfoil and/or impact the maximum operating temperature of the engine. As such, cooling is provided for the airfoil 310 to maintain blade temperature at an acceptable level, as described in greater detail below. Such cooling may include an internal cooling system that directs cooling air from inlets in the root 360 through internal cavities and passages to cool the airfoil 310 via convection and conduction. The air flowing through the internal cooling system may flow out of the airfoil 310 through the trailing edge slots 382 to provide temperature control of the trailing edge 318. Additionally, the cooling air flowing through the internal cooling system may also be supplied to film cooling holes 380 arranged to provide a cooling film of fluid onto the surface of the airfoil 310, as well as other locations. Moreover, as described below, cooling holes are provided to cool the tip portion 320 and to improve engine efficiency by minimizing tip leakage.

Figure 4:
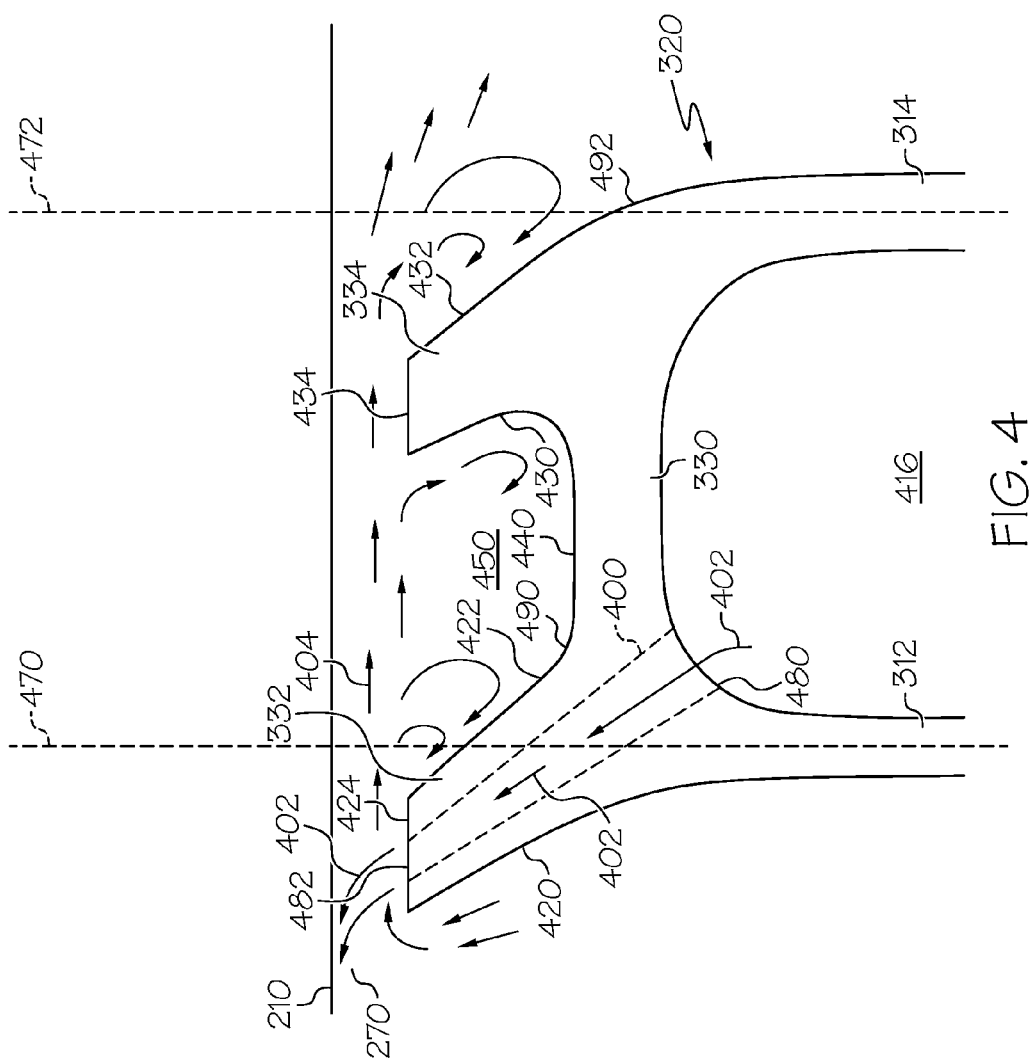
FIG. 4 is a simplified, close up, cross-sectional view of a tip portion of a turbine blade in accordance with an exemplary embodiment.

FIG. 4 is a partial cross-sectional view of the tip portion 320 of rotor blade 260 through line 4-4 of FIG. 3 in accordance with an exemplary embodiment. As discussed above with reference to FIG. 3, the tip portion 320 includes the tip cap 330 and squealer tip extensions 332, 334 extending from the pressure and suction side walls 312, 314, respectively. The tip portion 320 is in close proximity to the shroud 210 to define the gap 270.

FIG. 4 additionally shows a portion of the interior structure of the rotor blade 260, which includes a cooling channel 416 that is part of a cooling circuit that receives a flow of cooling air from passages in the root 360 (FIG. 3) and/or rotor discs (not shown). Such cooling air may be obtained as bleed flow from the compressor section 130 (FIG. 1). As described below, the cooing air is delivered to cool the tip portion 320 and to improve engine efficiency. In particular, cooling air 402 flows through cooling holes 400 to mitigate and/or prevent the impact of hot combustion gases flowing over the tip portion 320, generally referenced below as tip (or gap) leakage 404. If unaddressed, tip leakage 404 may result in undesirable temperature and efficiency issues. Additional details about the cooling holes 400, cooling air 402, and tip leakage 404 are provided below.

The pressure side squealer tip extension 332 includes a forward (or first) wall 420, an aft (or second) wall 422, and a radial wall (or tip edge) 424. The forward wall 420 generally faces the direction of combustion air flow, while the aft wall 422 is opposite the forward wall 420. As shown, the forward wall 420 has a forward surface that is coplanar to (or an otherwise continuous surface with) the forward surface of the pressure side wall 312 of the airfoil 310. In this manner, the pressure side squealer tip extension 332 is an extension of the pressure side wall 312, e.g., in contrast to some conventional arrangements in which a pressure side squealer tip extension is displaced axially way from the pressure side wall of the airfoil. The radial wall 424 is proximate to the shroud 210. Similarly, the suction side squealer tip extension 334 includes forward (or first) wall 430, an aft (or second) wall 432 opposite the forward wall 430, and a radial wall (or tip edge) 434 proximate to the shroud 210. An exposed (or edge) surface 440 of the tip cap 330, the aft wall 422 of the pressure side squealer tip extension 332, and the forward wall 430 of the suction side squealer tip extension 334 collectively form a tip recess cavity 450.

The pressure side squealer tip extension 332 and suction side squealer tip extension 334 may be substantially equal in height, e.g., as measured from the exposed surface 440 of the tip cap 330 to the radial walls 424, 434, respectively, as depicted in FIG. 4. However, in other embodiments, one of the squealer tip extensions 332, 334 is shorter than the other. Suitable height differences between the squealer tip extensions 332, 334 may include measurements between about 0.05 mm and about 0.40 mm, such height differences may be smaller or larger. One squealer tip extension 332, 334 may additionally or alternatively be thicker than the other squealer tip extension 332, 334. In any case, the coolant channel 416 is defined in part by an interior surface of the tip cap 330 and the pressure and suction side walls 312, 314.

As also shown in FIG. 4, the squealer tip extensions 332, 334 are curved or otherwise inclined in a forward direction. In particular, the pressure side squealer tip extension 332 is angled or curved relative to a first radial axis (or plane) 470 that otherwise extends through the pressure side wall 312. The pressure side squealer tip extension 332 extends upwardly and outwardly approximately 15-60° from the first radial axis 470, although any suitable angle may be provided. The squealer tip extensions 332, 334 are angled relative to radial axis 470, 472, respectively, and curved to blend with the rest of the blade surfaces. The curving is done to insure smooth transition between angled squealer tip wall and airfoil surfaces to avoid any discontinuity in the surfaces. In one exemplary embodiment, the suction side squealer tip extension 334 is parallel to the pressure side squealer tip extension 332, including angled orientations relative to a second radial axis 472, although in other embodiments, the squealer tip extensions 332, 334 may be non-parallel to one another. In one exemplary embodiment, a first junction 490 between the pressure side squealer tip extension 332 and the tip cap 330 may be angled or curved to facilitate a recirculation zone, as described in greater detail below. Similarly, a second junction 492 between the suction side squealer tip extension 334 and the suction side wall 214 may be angle or curved to facilitate another recirculation zone, as also described below.

Typically, the pressure side squealer tip extension 332 has a generally constant radius of curvature or angle, continuously along the chord-length from leading edge 316 (FIG. 3) to trailing edge 318 (FIG. 3) and follows the aerodynamic contour along the pressure side wall 312. However, in other embodiments, the squealer tip extensions 332, 334 are only inclined relative to the radial axis 470, 472 along a portion of the chord length, e.g., in portions that are particularly susceptible to tip leakage 404.

As introduced above, tip portion 320 includes cooling mechanisms for improving thermal characteristics and management. In particular, the tip portion 320 includes one or more cooling holes 400 that extend through the pressure side squealer tip extension 332. In the depicted exemplary embodiment of FIG. 4, a single cooling hole 400 is shown. A row of cooling holes 400 extend along the chord-length of the pressure side squealer tip extension 332. Each cooling hole 400 may have a diameter in a range of about 0.20 mm to about 0.70 mm, as an example, and other diameters may be provided.

The cooling holes 400 extend from the underside of the pressure side squealer tip extension 332 with an inlet 480 fluidly coupled to the cooling channel 416. Although cooling channel 416 is depicted adjacent to the tip cap 330, the cooling holes 400 may receive cooling air 402 from any portion of the rotor blade 260. In the depicted exemplary embodiment, each cooling hole 400 has an outlet 482 on the radial wall 424 of the pressure side squealer tip extension 332. In other embodiments, the outlet 482 may be positioned on the forward or aft wall 420, 422. However, generally, the outlet 482 is in the radial wall 424 and in the outermost radial position of the rotor blade 260 such that the outlet 482 is immediately adjacent to the gap 270. Typically, the cooling hole 400 extends through the middle of the pressure side squealer tip extension 332, or more generally, has a centerline that is parallel to the centerline of the pressure side squealer tip extension 332. As such, in the depicted embodiment, the cooling hole 400 has approximately the same angle of orientation relative to the radial axis 470 as the pressure side squealer tip extension 332. In other embodiments, the cooling hole 400 is oriented at a different angle relative to radial axis 470 as compared to the pressure side squealer tip extension 332. In general, the second squealer tip extension 334 is solid, e.g., without a cooling hole. However, in some embodiments, the second squealer tip extension can include one or more cooling holes.

In one exemplary embodiment, each cooling hole 400 converges along the length between the inlet 480 and the outlet 482 in one or more dimensions. In particular, each cooling hole 400 has a cross-sectional area that decreases along the length between the inlet 480 and the outlet 482. In one exemplary embodiment, the cross-sectional area continuously decreases along the length between the inlet 480 and the outlet 482. The converging nature of the cooling holes 400 results in an increased flow velocity while preventing or mitigating pressure losses at the hole inlet, thereby maximizing the pressure of the air flow through the outlet 482, as described in greater detail below. The inlet to exit area ratio can typically vary between 1.5 to 2, although other area ratios may be provided.

During operation, as noted above, when the rotor rotates, air from an airflow is ingested and directed to a corresponding blade, such as blade 260. As noted above, the radial gap 270 between the tip portion 320 and the shroud 210 is very small. In general, tip leakage 404 over tip portion 320 is a source of efficiency loss. The cooling holes 400 and squealer tip extensions 332, 334 function to address this issue, as well as improving the overall temperature characteristics of the tip portion 320, as will now be described.

As noted above, the cooling holes 400 deliver a high momentum flow of cooling air 402 to the pressure side radial wall 424 to partially block the entry of tip leakage 404 into the tip gap 270. The angled nature of the pressure side squealer tip extension 332, and thus cooling hole 400, provides an upstream component to the resulting cooling air 402, thereby providing a more direct opposition to the tip leakage flow 404. Additionally, the converging cooling holes 400 function to provide cooling air 402 with a pressure and velocity sufficient to partially block the tip leakage 404, particularly considering the amount of cooling air 402 available for the tip portion 320. In one exemplary embodiment, the orientation of the pressure side squealer tip extension 332 and cooling air 402 result in a vena contracta effect of the tip leakage effective area and thereby resulting in reduced leakage flow 404.

In addition to partially blocking the tip leakage 404, the cooling air 402 functions to lower the temperature of the remaining portion of the tip leakage 404 that flows axially beyond the pressure side squealer tip extension 332, thus providing improved thermal management of the tip portion 320, particularly the squealer tip extensions 332, 334 and tip cap 330. As a result, the cooling air 402 may result in lower metal temperatures of the squealer tip extensions 332, 334, tip cap 330, and suction side wall 214.

In one exemplary embodiment, the angled orientations of the squealer tip extensions 332, 334 function to create vortices that further block or mitigate tip leakage. In particular, the first junction 490 between the pressure side squealer tip extension 332 and the tip cap 330 may be angled or curved to facilitate a recirculation zone, and the second junction 492 between the suction side squealer tip extension 334 and the suction side wall 314 may be angle or curved to facilitate another recirculation zone. The curved suction side squealer wall extension 432, would promote partial reattachment of the flow onto the suction surface 314 caused by Coanda effects.

Figure 5:
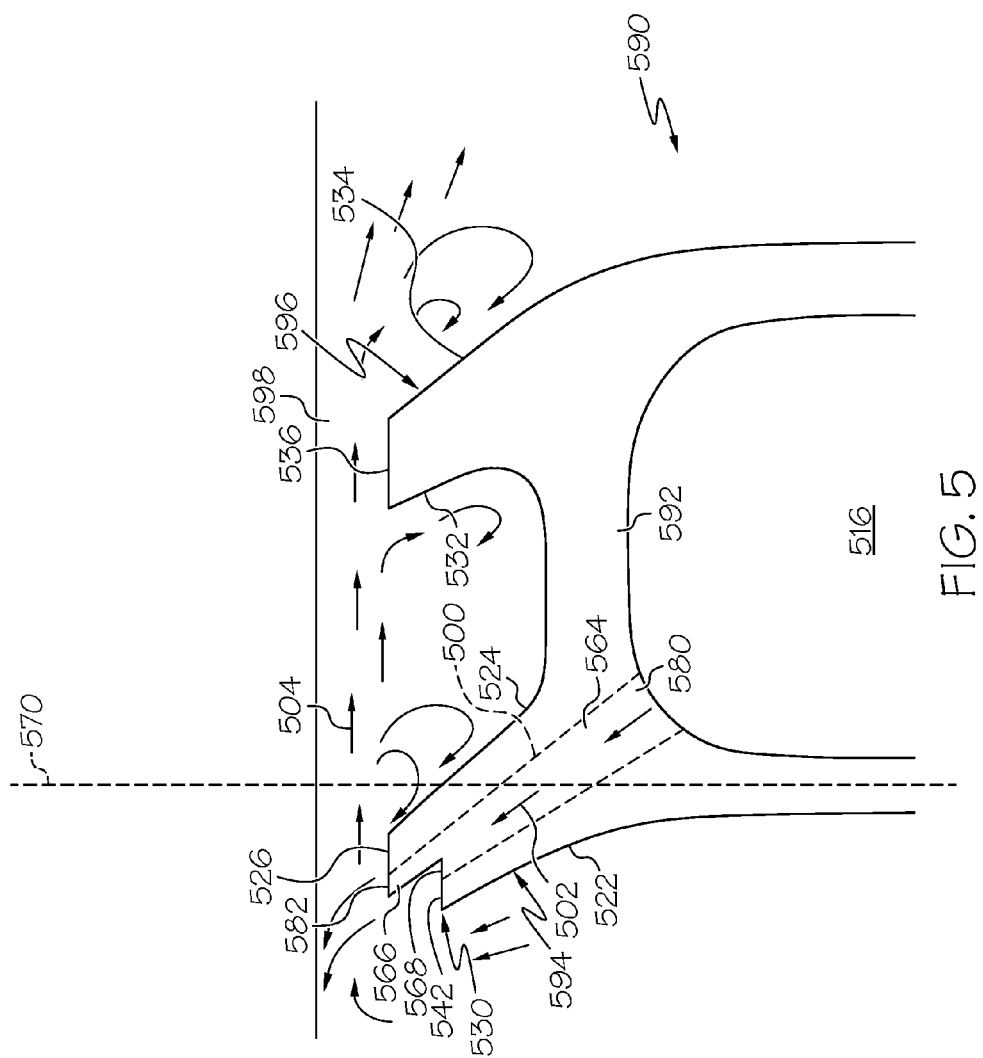
FIG. 5 is a simplified, close up, cross-sectional view of a tip portion of a turbine blade, according to another exemplary embodiment.

FIG. 5 is a partial cross-sectional view of a tip portion 590 of a rotor blade in accordance with an alternate exemplary embodiment. Unless otherwise noted, the tip portion 590 of FIG. 5 corresponds to the tip portion 320 and rotor blade 260 described above with reference to FIGS. 2-4. As shown, the cross-sectional view may generally correspond to a cross-sectional view through a radial-chordwise plane. As above, the tip portion 590 includes the tip cap 592 and pressure and suction side squealer tip extensions 594, 596.

The pressure side squealer tip extension 594 includes a forward wall 522, an aft wall 524, and a radial wall 526. Similarly, the suction side squealer tip extension 596 includes forward wall 532, an aft wall 534, and a radial wall 536 proximate to the shroud. As also shown in FIG. 5, the squealer tip extensions 594, 596 are curved or otherwise inclined in a forward direction. In particular, the pressure side squealer tip extension 594 is angled or curved relative to a first radial axis 570, e.g., outwardly approximately 15-60° from the first radial axis 570, although any suitable angle may be provided. In one exemplary embodiment, the suction side squealer tip extension 596 is parallel to the pressure side squealer tip extension 594, although in other embodiments, the extensions 594, 596 may be non-parallel to one another.

As introduced above, tip portion 590 includes cooling mechanisms for improving thermal characteristics and management. In particular, the tip portion 590 includes one or more cooling holes 500 that extend through the pressure side squealer tip extension 594. The cooling holes 500 extend from the underside of the pressure side squealer tip extension 594 with an inlet 580 fluidly coupled to a cooling channel 516. In the depicted exemplary embodiment, each cooling hole 500 has an outlet 582 at least partially formed in the radial wall 526 of the pressure side squealer tip extension 594. Typically, the cooling hole 500 has a centerline that is parallel to the centerline of the pressure side squealer tip extension 594, e.g., at the same angle of orientation relative to the radial axis 570 as the pressure side squealer tip extension 594. In other embodiments, the cooling hole 500 is oriented at a different angle relative to radial axis 570 as compared to the pressure side squealer tip extension 594.

Because the radial gap 598 between the tip portion 590 and the shroud is very small, the squealer tip extensions 594, 596 may contact and abrade against a surface of the shroud. In this regard, the tip portion 590 includes a step 530 to prevent or mitigate any blockage of the cooling hole 500 resulting from this abrading of the squealer tip extensions 594, 596.

The step 530 is formed within the pressure side squealer tip extension 594, typically on the forward side of the squealer tip extension 594, although the step 530 may also be formed in the aft side. In particular, the step 530 may be defined by a second radial surface 542 in the pressure side squealer tip extension 594. Although illustrated in FIG. 5 as being parallel relative to each other, the radial surface 542 and radial surface 526 are may be angled relative to one another in other embodiments.

The step 530 may have a height measured from the tip cap 592 to the radial surface 542 in a range of about 20% to about 80% of a total height of the pressure side squealer tip extension 594, although other heights may be provided. Generally, the step 530 has a greater height than the exposed surface of the tip cap 592, e.g., the tip cap 592 and step 530 are typically not coplanar. The thickness of the step 530 may be about 50% of the total thickness of the pressure side squealer tip extension 594, although other thicknesses may be provided.

The cooling hole 500 is arranged to have a closed channel section 564 and an open channel section 566, wherein the closed channel section 564 extends from the inlet 580, through the step 530, and to a partial outlet 568 in the radial wall 542 of the step 530, and the open channel section 566 extends from the radial wall 542, through the pressure side squealer tip extension 594, and to the outlet 582 in the radial wall 526. As such, at least a portion of the cooling hole 500 is provided along the entire length of the pressure side squealer tip extension 594. Additionally, Since a portion of the cooling hole 500 is configured as the open channel section 566 (e.g., groove), air can still be supplied to the gap 598 in an event in which a portion of the pressure side squealer tip extension 594 abrades against the shroud and causes blockage in the hole openings on the outer radial wall 526. As such, tight turbine tip clearances may be maintained, even considering varying transient effects of the gas turbine engines, such the different requirements and loads of take-off portion of the aircraft flight cycle as compared to cruise conditions.

As such, the closed channel section 564 has a closed channel section 564 continuing to the open channel section 566 towards the partial outlet 568 in step 530. In the exemplary embodiment illustrated in FIG. 6, the closed channel section 564 starts with a circular cross-section at the inlet 580 and extends with a reducing area to an oval cross-sectional shape in the open channel section 566. In other embodiments, the cross-sectional shape may be a circle, an oval, a triangle, a different polygon shape, a teardrop, or a different shape.

As the cooling hole 400 discussed above in reference to FIG. 4, the cooling hole 500 may have a converging cross-sectional area such that the velocity and pressure increase along the length of the cooling hole 500. In particular, the cooling hole 500 may have a relatively enlarged area at the inlet 580 to ensure low velocity and low entrance pressure losses, while the closed channel section 564 has a converging cross-sectional area such that the cooling air 502 has sufficient velocity and pressure to obstruct a portion of the tip leakage 504 and to cool the remaining portions. As a result, the thermal management of the tip portion 590 and the engine efficiency are improved.

Figure 6:
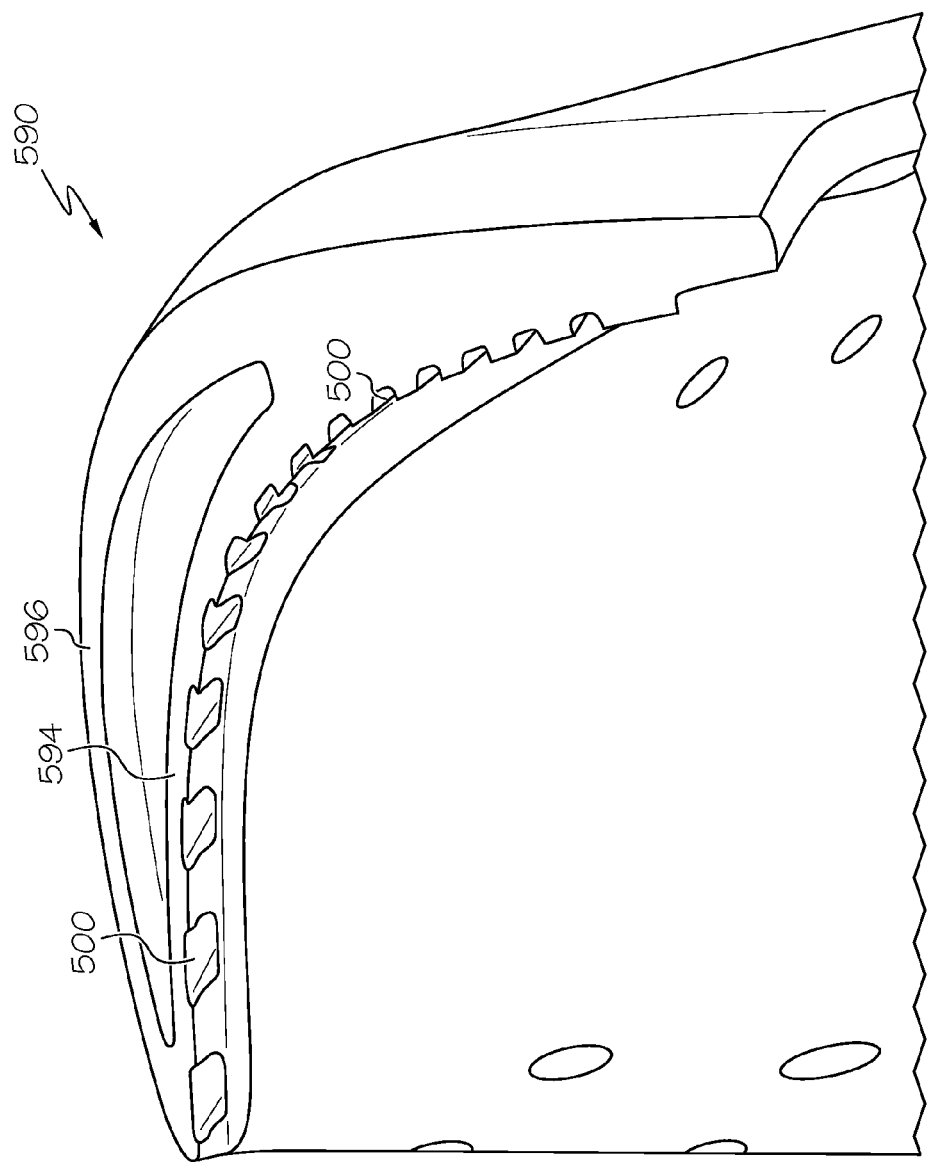
FIG. 6 is a partial isometric view of the turbine blade of FIG. 5 in accordance with an exemplary embodiment.

Reference is briefly made to FIG. 6, which is a partial isometric view of the tip portion 590 discussed in reference to FIG. 5. FIG. 6 particularly depicts the tip portion 590 from the trailing edge and the cooling holes 500 the pressure side squealer tip extension 594. FIG. 6 additionally depicts the curvature and/or angled nature of the pressure side squealer tip extension 594 and the suction side squealer tip extension 596, as described in the embodiments above. As shown, the curved squealer tip extensions 594, 596 extend all the way to the trailing edge.

The exemplary embodiments discussed above may be manufactured in any suitable ways. For example, the blade including a tip portion with squealer tip extensions and step may be formed by a lost wax casting process. In some embodiments, the step and the holes are electro-discharge machined into the desired squealer tip extension. In still another embodiment the squealer tip extensions, step and the holes are formed by employing a different fabrication process, such as by laser sintering.

In general, tip leakage flow over gas turbine blades is a source of efficiency loss and consequently an undesirable increase in overall engine Specific Fuel Consumption (SFC). As an example, an increase of one percent in tip clearance to blade height ratio is usually associated with over two percent performance loss. As such, the blocking and/or mitigation of tip leakage in the exemplary embodiments discussed above results in significant efficiency improvements. Additionally, the improved tip portion cooling enables a reduction in cooling air that may be used in other locations and/or redirected to mainstream gas flow. The increase in efficiency resulting the cooling air provided to the tip portion through the cooling holes more than make up for the efficiency cost of supplying the cooling air, particularly as a result of the converging nature of the corresponding high pressure and velocity. In general, the angled orientation of the squealer tip extensions do not require any weight increase compared to a similar conventional blades, and therefore, is applicable to high speed (high $AN^2$) designs. Moreover, the angled orientation is in a relatively low stress region, thereby conforming with stress requirements. Such exemplary embodiments have a reduced tip leakage vortex and smaller regions of total pressure deficit associated with the tip leakage vortex, thereby decreasing turbine performance loss. Exemplary embodiments of the turbine blades discussed above have resulted in an ability to increase engine temperature, thereby improving fuel consumption.

In addition to the cooling holes and squealer tip extensions discussed above, exemplary embodiments may also use turbulators, depressions, other types of cooling holes, and other techniques that may enhance tip portion cooling. Computational fluid dynamic (CFD) analysis can additionally be used to optimize the location and orientation of the cooling holes and squealer tip extensions. Exemplary embodiments promote the service life and/or enhanced performance in a cost-effective manner. The turbine blades produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine rotor blade for a turbine section of an engine, the turbine section including a shroud surrounding the turbine rotor blade, comprising:
    a platform; and
    an airfoil extending from the platform into a mainstream gas path of the turbine section, the airfoil comprising
        a pressure side wall;
        a suction side wall joined to the pressure side wall at a leading edge and a trailing edge;
        a tip cap extending between the suction side wall and the pressure side wall;
        a first squealer tip extension extending from the pressure side wall at a first angle relative to the pressure side wall, the first squealer tip extension defining a first cooling hole that converges from an inlet to an outlet, wherein the first squealer tip extension terminates at a radial wall, and wherein the outlet of the first cooling hole is formed on the radial wall,
    wherein the first squealer tip extension includes a forward surface that is continuous with a forward surface of the pressure side wall and is completely forward of the forward surface of the pressure side wall relative to a radial axis of the pressure side wall, and wherein the first squealer tip extension further includes a trailing surface that extends in a forward direction at a second angle, non-parallel to the radial axis of the pressure side wall, and a second squealer tip extension extending from the suction side wall at a third angle relative to the suction side wall, wherein the second squealer tip extension includes a trailing surface that is continuous with a trailing surface of the suction side wall and is completely forward of the trailing surface of the suction side wall relative to a radial axis of the suction side wall; and an internal cooling circuit configured to deliver cooling air to a gap between the pressure side squealer tip extension and the shroud via the first cooling hole.

2. The turbine rotor blade of claim 1, wherein the first angle is approximately equal to the second angle.

3. The turbine rotor blade of claim 1, wherein the second squealer tip extension is solid.

4. The turbine rotor blade of claim 1, wherein the outlet of the first cooling hole is completely formed on the radial wall.

5. The turbine rotor blade of claim 1, wherein the first cooling hole has a longitudinal center line oriented at the first angle relative to the pressure side wall.

6. The turbine rotor blade of claim 1, wherein the first cooling hole is oriented such that the cooling air blocks at least a portion of tip leakage between the first squealer tip extension and the shroud.

7. The turbine rotor blade of claim 1, wherein the first angle is 15°-60°.

8. The turbine rotor blade of claim 1, wherein the airfoil further comprises a step formed in the first squealer tip extension.

9. The turbine rotor blade of claim 8, wherein the first cooling hole at least partially extends through the step.

10. The turbine rotor blade of claim 9, wherein the first cooling hole includes a closed channel section through the step and an open channel section through the first squealer tip extension.

11. The turbine rotor blade of claim 1, wherein the first angle is constant along a chord-length from the leading edge to the trailing edge.

12. A turbine section of a gas turbine engine, comprising:
a shroud; and
a rotor assembly with a turbine rotor blade comprising
a platform defining a mainstream gas path; and
an airfoil extending from the platform into the mainstream gas path; the airfoil comprising
a pressure side wall;
a suction side wall joined to the pressure side wall at a leading edge and a trailing edge;
a tip cap extending between the suction side wall and the pressure side wall;
a first squealer tip extension extending from the pressure side wall to define a gap between the rotor assembly and the shroud, the first squealer tip extension extending at a first angle relative to the pressure side wall and defining a first cooling hole that converges from an inlet to an outlet, wherein the first squealer tip extension terminates at a radial wall, and wherein the outlet of the first cooling hole is formed on the radial wall, wherein the first squealer tip extension includes a forward surface that is continuous with a forward surface of the pressure side wall and is completely forward of the forward surface of the pressure side wall relative to a radial axis of the pressure side wall, and wherein the first squealer tip extension further includes a trailing surface that extends in a forward direction at a second angle, non-parallel to the radial axis of the pressure side wall, and a second squealer tip extension extending from the suction side wall at a third angle relative to the suction side wall, wherein the second squealer tip extension includes a trailing surface that is continuous with a trailing surface of the suction side wall and is completely forward of the trailing surface of the suction side wall relative to a radial axis of the suction side wall; and an internal cooling circuit configured to deliver cooling air to the gap between the pressure side squealer tip extension and the shroud via the first cooling hole.

13. The turbine section of claim 12, wherein the second squealer tip extension is solid.

14. The turbine section of claim 12, wherein the first cooling hole has a longitudinal center line oriented at the first angle relative to the pressure side wall.

15. The turbine section of claim 12, wherein the first cooling hole is oriented such that the cooling air blocks at least a portion of tip leakage between the first squealer tip extension and the shroud.

16. The turbine section of claim 12, wherein the first angle is 15°-60°.

17. The turbine section of claim 12, wherein the airfoil further comprises a step formed in the first squealer tip extension on the tip cap, and wherein the first cooling hole at least partially extends through the step.

* * * * *